United States Patent Office 2,904,577
Patented Sept. 15, 1959

2,904,577

ORGANOPHOSPHORUS DERIVATIVES OF THIAZYL HALIDES

Joseph B. Dickey and Marvin A. McCall, Kingsport, Tenn., assignors to Eastman Kodak Company, Rochester, N.Y., a corporation of New Jersey No Drawing. Application November 25, 1957
Serial No. 698,354

12 Claims. (Cl. 260—461)

This invention relates to new organophosphorus compounds and to their method of preparation. In a specific aspect this invention relates to the preparation of new organophosphorus compounds by the reaction of phosphorothiolothionates with thiazyl halides and to the products of this process.

Organophosphorus compounds have evidenced marked utility and importance in many fields. For example, they have been employed as insecticides, fungicides, pesticides and in related uses. Consequently, it is of considerable importance to discover new and useful organophosphorus compounds and to have a new process for the production of organophosphorus compounds. Therefore, it is an object of this invention to provide new and useful organophosphorus compounds. It is another object of this invention to provide a novel method for preparing the new and useful organophosphorus compounds. It is still another object of this invention to provide new and valuable insecticides that can be used in various insecticidal compositions.

In accordance with this invention it has been found that new organiphosphorus compounds, useful as insecticides, can be prepared by reacting phosphorothiolothionates with thiazyl halides. The new products of this invention have the structural formulas:

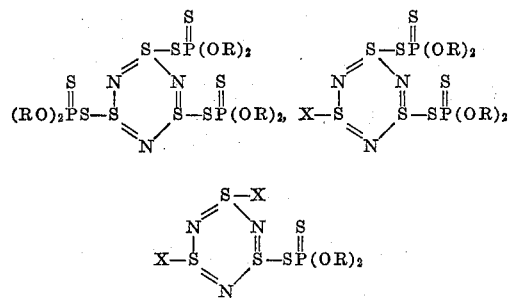

wherein R is selected from the group consisting of lower alkyl radicals containing 1 to 4 carbon atoms, haloalkyl radicals containing 1 to 4 carbon atoms (e.g. chloroethyl, chloropropyl, trichloroethyl, and the like) and alkoxyalkyl radicals wherein the alkoxy group and the alkyl group each contain from 2 to 4 carbon atoms (e.g. methoxymethyl, methoxyethyl, methoxypropyl, and the like) and X represents a halogen atom.

The products of this invention are formed in accordance with the following illustrative equations:

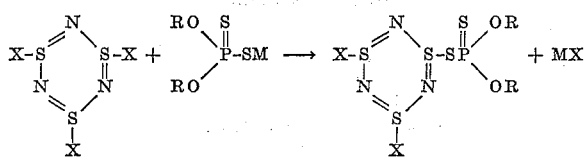

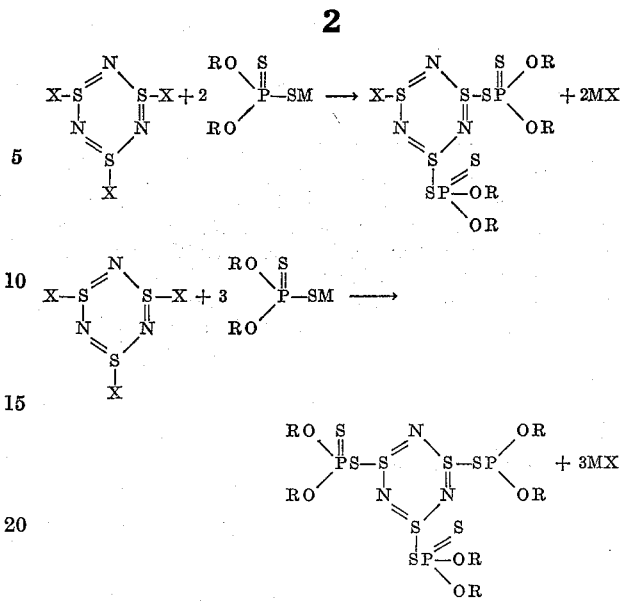

wherein R and X are as defined above and M is selected from the group consisting of the alkali metals, an ammonium radical and a hydrogen atom.

In the practice of this invention we prefer to add one of the reactants gradually to a reactor containing the other reactant. For example, the triazyl chloride can be added gradually to a reactor containing the phosphorothiolothionate. Alternattively however, the reverse procedure of addition of reactants can be used and the phosphorothiolothionate can be added to a reactor containing the triazyl chloride. Normally it is desirable to employ a reactor provided with adequate means of agitation and, since the reaction is quite exothermic, it is also desirable to employ a reactor that is provided with adequate cooling means.

The operable temperature range for the reaction is generally from 25 to 200° C. and the preferred temperature range is from 25 to 100° C. However, it will be realized that in some instances temperatures outside this range can be employed. The reaction time usually variese from 0.5 to 8 hours, but longer and shorter reaction periods are sometimes used.

Ordinarily, it is not necessary to employ a solvent for the reaction but in some instances solvents are desirable. Among the solvents that can be used are normally liquid aliphatic and aromatic hydrocarbons such as pentane, heptane, octane, benzene, toluene, the xylenes and the like, chlorinated derivatives of the above-mentioned hydrocarbons as well as the common ether and ester solvents. The motar ratio of reactants can be varied widely, but we prefer to carry out the reaction using molar ratios within the range of 1:1 to 3.1 of phosphorothiolothionate to thiazyl halide. However, it will be understood that molar ratios outside this range can be used.

The dialkyl or substituted dialkyl phosphorothiolothionates that are used in our invention can be prepared by the reaction of 4 moles of the appropriate alcohol with one mole of phosphorus pentasulfide. The thiazyl can be prepared by treatment of tetrasulfur tetranitride with halogens, e.g. chlorination of tetrasulfur tetranitride yields thiazy chloride. Tetrasulfur tetranitride can be prepared by the reaction of sulfur monochloride and ammonia (Chem. Reviews, vol. X, No. 4 (1956)).

The following examples are illustrative of the compounds within the scope of this invention, their method of preparation and their utility as insecticides.

*Example 1.—2,4,6-trithia-s-triazine-2,4,6-trithiol tris (O,-O-diethyl phosphorothiolothionate)*

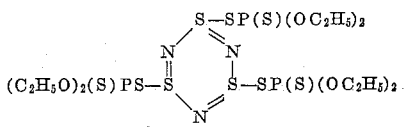

The yellow solid trithiazyl trichloride (0.1 mole) was dissolved in dry benzene and added dropwise to O,O-diethyl phosphorothiolothionate (0.3 mole) with stirring. After the addition was complete, the reaction mixture was heated on the steam bath to complete the reaction. Nitrogen was bubbled under the surface of the reaction mixture to aid the escape of the hydrogen chloride formed in the reaction. The benzene and any resirual hydrogen chloride was removed by vacuum stripping. The product was a dark, viscous oil.

*Example 2*

The product of Example 1 was also obtained when trithiazyltrichloride (0.1 mole) is reacted with ammonium O,O-diethyl phosphorothiolothionate (0.3 mole) in dry acetone. The ammonium chloride byproduct is removed by filtration. The product was obtained after the acetone was removed by vacuum stripping.

*Example 3.—6-chloro-2,4,6-trithia-s-triazine-2,4-dithiol bis (O,O-diethyl phosphorothiolothionate)*

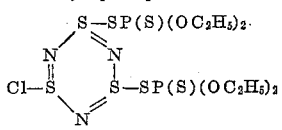

The yellow solid trithiazyl trichloride (0.1 mole) was dissolved in dry toluene and added dropwise to O,O-diethyl phosphorothiolothionate (0.2 mole). The reaction procedure was the same as that described in Example 1. The product was an oily semisolid material.

*Example 4*

The same product produced in Example 3 was obtained from the reaction of trithiazyltrichloride (0.1 mole) and either ammonium or potassium O,O-diethyl phosphorothiolothionate (0.2 mole) according to the procedure given in Example 2.

*Example 5.—4,6-dichloro-2,4,6-trithia-s-triazine-2-thiol O,O-diethyl phosphorothiolothionate*

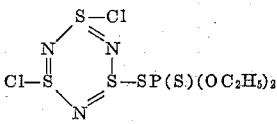

The yellow solid trithiazyl trichloride (0.1 mole) was reacted with O,O-diethyl phosphorotiholothionate (0.1 mole) by heating the reaction mixture on a steam bath under a stream of nitrogen until all the hydrogen chloride was evolved. The product was a semisolid material which had considerable pesticidal properties.

*Example 6*

In a similar manner as given in the examples above, the following phosphorothiolothionates or their ammonium, potassium, or sodium salts were reacted with trithiazyl trichloride to produce the corresponding derivatives of trithiazyl chloride:

(a) $HSP(S)(OC_3H_7)_2$
(b) $HSP(S)(OC_2H_5)(OS_3H_7)$
(c) $HSP(S)(OC_2H_4Cl)_2$
(d) $HSP(S)(OCH_2—CCl_3)_2$
(e) $HSP(S)(OCH_2—CH_2OCH_3)_2$

*Example 7.—Use of compounds as insecticides*

Tests against mites were carried out in the following manner. Acetone solutions containing 1% of the candidate compounds were prepared and diluted with water to give solutions of the desired concentration for testing. Two heavily infested bean leaves containing adult two-spotted mites (*Tetranychus bimaculatus* Harvey) were carefully dipped in the above solutions and dried in a gentle air stream. The leaves were then placed on damp paper toweling in Petri dishes and observed after 24 hours for mortality among adult mites. It should be noted that tests using acetone-water solutions containing none of the toxicant kill none of the mites.

| Toxicant | Concentration of Toxicant in p.p.m. | Percent Kill of Mites |
|---|---|---|
| 1. 2, 4, 6-Trithia-s-triazine-2, 4, 6-trithiol tris (O, O-diethyl phosphorothiolothionate) (Ex. 1 or 2) | 100 / 30 / 10 | 100 / 90 / 89 |
| 2. 6-Chloro-2, 4, 6-trithia-s-triazine-2, 4-dithiol bis (O, O-diethyl phosphorothiolothionate) (Ex. 3 or 4) | 100 / 30 / 10 | 100 / 92 / 87 |
| 3. 4, 6-Dichloro-2, 4, 6-trithia-s-triazine-2-thiol O, O-diethyl phosphorothiolothionate (Ex. 5) | 100 / 30 / 10 | 100 / 93 / 89 |
| 4. 4, 6-Dichloro-2, 4, 6-trithia-s-triazine-2-thiol O-ethyl, O-propyl phosphorothiolothionate (Ex. 6b) | 100 / 30 / 10 | 95 / 92 / 88 |

The compounds of Examples 6a, 6c, 6d, and 6e were similarly effective when used in the above tests.

We claim:

1. The organophosphorus compounds having the structural formulas:

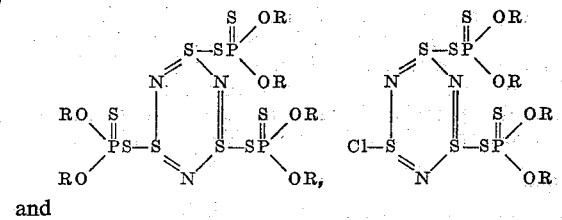

and

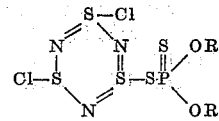

wherein R is selected from the group consisting of lower alkyl, haloalkyl and alkoxyalkyl.

2. As a new composition of matter 2,4,6-trithia-s-triazine-2,4,6-trithiol tris (O,O-diethyl phosphorothiolothionate) having the following formula:

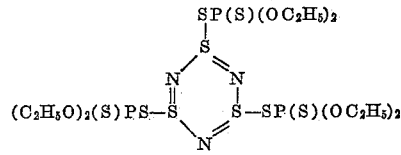

3. As a new composition of matter 6-chloro-2,4,6-trithia-s-triazine-2,4-dithiol bis (O,O-diethyl phosphoro-thiolothionate) having the following formula:

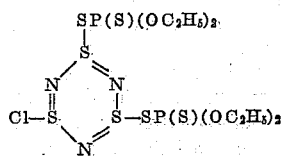

4. As a new composition of matter 4,6-dichloro-2,4,6-trithia-s-triazine-2-thiol O,O-diethyl phosphorothiolothionate having the following formula:

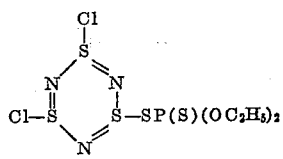

5. As a new composition of matter 2,4,6-trithia-s-triazine-2,4,6-trithiol tris [O,O-bis(2,2,2-trichloroethyl)phosphorothiolothionate] having the following formula:

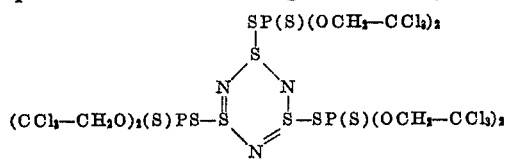

6. As a new composition of matter 4,6-dichloro-2,4,6-trithia - s - triazine - 2 - thiol O,O - bis(2 - methoxyethyl)-phosphorothiolothionate having the following formula:

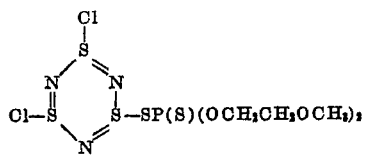

7. The method for producing the organophosphorus compounds of claim 1 which comprises reacting a trithiazyl chloride with a phosphorothiolothionate having the formula MSP(S)(OR)₂ wherein R is selected from the group consisting of lower alkyl, haloalkyl and alkoxyalkyl and M is selected from the group consisting of alkali metals, an ammonium radical and hydrogen at a temperature within the range of 25 to 200° C.

8. The method for producing a new organophosphorus compound which comprises reacting one mole of trithiazyl trichloride with three moles of O,O-diethyl phosphorothiolothionate or with three moles of ammonium O,O-diethyl phosphorothiolothionate at a temperature within the range of 25 to 200° C.

9. The method for producing a new organophosphorus compound which comprises reacting one mole of trihiazyl trichloride with two moles of O,O-diethyl phosphorothiolothionate or with two moles of potassium O,O-diethyl phosphorothiolothionate at a temperature within the range of 25 to 200° C.

10. The method of producing a new organophosphorus compound which comprises reacting one mole of trithiazyl trichloride with one mole of O,O-diethyl phosphorothiolothionate or with one mole of ammonium O,O-diethyl phosphorothiolothionate at a temperature within the range of 25 to 200° C.

11. The method of producing a new organophosphorus compound which comprises reacting one mole of trithiazyl trichloride with three moles of O,O-bis(2,2,2-trichloroethyl)phosphorothiolothionate or with three moles of ammonium O,O - bis(2,2,2 - trichloroethyl)phosphorothiolothionate at a temperature within the range of 20 to 200° C.

12. The method of producing a new organophosphorus compound which comprises reacting one mole of trithiazyl trichloride with one mole of O,O-bis(2-methoxyethyl)-phosphorothiolothionate or with one mole of sodium O,O - bis(2 - methoxyethyl)phosphorothiolothionate at a temperature within the range of 25 to 200° C.

No references cited.

UNITED STATES PATENT OFFICE
CERTIFICATE OF CORRECTION

Patent No. 2,904,577                                        September 15, 1959

Joseph B. Dickey et al

It is hereby certified that error appears in the printed specification of the above numbered patent requiring correction and that the said Letters Patent should read as corrected below.

Column 1, line 36, for "organiphosphorus" read -- organophosphorus --; line 60, for "2" read -- 1 --; column 2, line 32, for "Alternattively" read -- Alternatively --; line 45, for "variese" read -- varies --; line 56, for "3.1" read -- 3:1 --; line 66, for "thiazy" read -- thiazyl --; line 63, after "thiazyl" insert -- halides --; column 3, line 16, for "resirual" read -- residual --; line 55, for "phosphorotiholothionate" read -- phosphorothiolothionate --; line 69, change the compound in (b) to -- $HSP(S)(OC_2H_5)(OC_3H_7)$ --; column 6, line 6, for "trihiazyl" read -- trithiazyl --; line 22, for "20" read -- 25 --.

Signed and sealed this 29th day of March 1960.

(SEAL)
Attest:

KARL H. AXLINE                                             ROBERT C. WATSON
Attesting Officer                                    Commissioner of Patents